United States Patent

[11] 3,572,759

| [72] | Inventors | Robert T. Baugh<br>Brookfield;<br>Craig W. Cannon, New Berlin, Wis. |
|---|---|---|
| [21] | Appl. No. | 786,088 |
| [22] | Filed | Dec. 23, 1968 |
| [45] | Patented | Mar. 30, 1971 |
| [73] | Assignee | Allis-Chalmers Manufacturing Company<br>Milwaukee, Wis. |

[54] LATCH CONTROL MEANS
10 Claims, 6 Drawing Figs.

[52] U.S. Cl. .................................................. 280/461,
172/272, 172/430, 172/439
[51] Int. Cl. .................................................. B62d 53/00
[50] Field of Search .......................................... 280/460,
460 (.1), 461, 461 (.1), 479; 172/272—275;
172/271, 430, 439

[56] References Cited
UNITED STATES PATENTS

| 2,869,654 | 1/1959 | Hershman | 172/272 |
|---|---|---|---|
| 2,890,896 | 6/1959 | Hendrickson | 280/467 |
| 2,912,257 | 11/1959 | DuShane | 280/460(.1) |
| 2,996,126 | 8/1961 | Voegeli | 172/272 |
| 3,195,651 | 7/1965 | Todd | 172/272 |
| 3,220,751 | 11/1965 | Tweedale | 280/461(.1) |
| 3,312,478 | 4/1967 | Knaapi | 280/479X |
| 3,420,550 | 1/1969 | Rau | 280/461(.1) |
| 3,489,431 | 1/1970 | McKeon | 280/478 |

*Primary Examiner*—Leo Friaglia
*Attorneys*—Arthur L. Nelson, Kenneth C. McKivett and Robert B. Benson

ABSTRACT: A latching means on a vehicle-hitching device having remote latching control.

PATENTED MAR 30 1971 3,572,759

Inventors
Craig W. Cannon
Robert F. Baugh

By Archie W. Wilson
Attorney

LATCH CONTROL MEANS

This invention relates to a vehicle hitch and more particularly to a remote-controlled latch on pivotal draft arms with an indicator at the operator's station on the vehicle.

The conventional means for hitching draft vehicles to implements over the years has been the use of a pin connecting the drawbar to the implement. With the advent of the more sophisticated hitching arrangements such as the three-point hitch the crosspin was still used in connecting the hitching mechanism on the draft vehicle to the implement. The increase in vehicle size and horsepower output has initiated a development for use of a hitch adapter carried on the rear of the three point hitch. Hooks are provided on the hitch adapter to engage and latch the implement securely to the hitch adapter.

A further improvement of this type of hitching arrangement is providing the operator a means to control the latch from the operator's station. Accordingly, this invention provides a cable operated latch which controls the latch on the hitch adapter supported on the pivotal draft arms. A pivotal movement of the upper link and draft arms does not change the latch operation because of the unique arrangement of the cable between the control lever on a panel adjacent the operator's seat and the latch. The panel and lever provide an indication of the position of the latch element relative to the latch hook. The principle of operation is in that for a given cable movement at the lever end a similar cable movement is effected at the latch end.

It is an object of this invention to provide a positive locking latch having a remote manual control at the operator's station.

It is another object of this invention to provide a remote control hook and latch on a three-point hitch having a control at the operator's station on the draft vehicle.

It is another object of this invention to provide a remotely controlled latch with visual indicators at the latch position.

The objects of this invention are accomplished by a hook and latch on a hitch adapter carried on the ends of the upper link and draft arms of the three point hitch. The latch pivots over center thereby causing a force directed on a latching element at the point engaging a portion of the lower hook. The latch is operated by a cable providing a predetermined movement regardless of the pivotal position of the draft arms. The cable is remotely controlled from a panel at the operator's station on the vehicle. The latching device provides positive operation and can be operated by the operator without dismounting from the vehicle which provides safety and added convenience for hitching the vehicle to the implement.

The preferred embodiments of this invention will be described in the following paragraphs and illustrated in the attached drawings.

Figure 1:
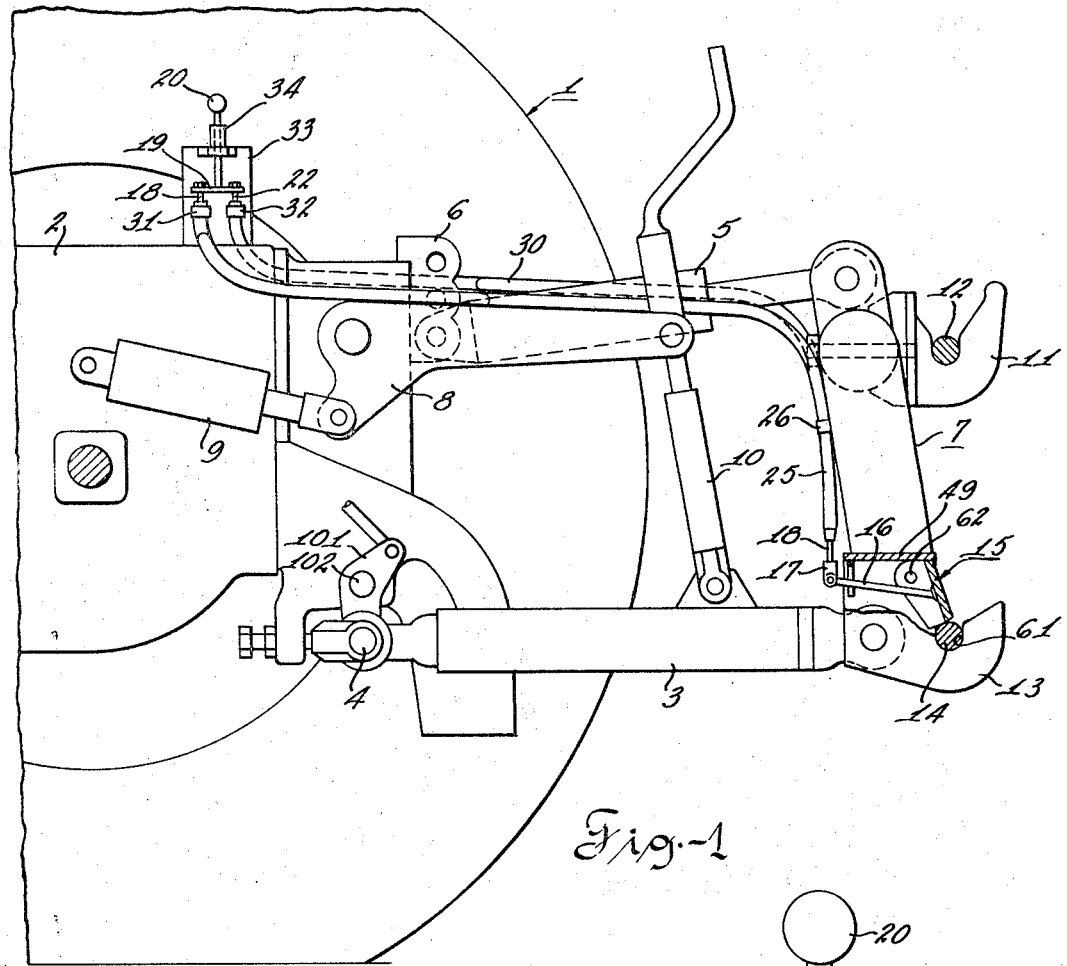
FIG. 1 illustrates a three-point hitch on a draft vehicle including a hook with a latching means.

Referring to the drawings the draft vehicle 1 includes a gearcase 2. The gearcase supports the hitch mechanism. The hitch includes the draft arms 3 pivotally mounted on the crossshaft 4 which is connected to a torsion bar 102 by the bellcrank 101. The upper link 5 is pivotally supported on the bracket 6 fastened on the gearcase 2. The rearward end of the upper link 5 pivotally supports the hitch adapter 7. The rearward end of the draft arms 3 also pivotally support the hitch adapter 7. The bellcrank 8 is operated by the hydraulic actuator 9. The bellcrank 8 is connected to the lift links 10 which in turn are connected to intermediate portions of the draft arms 3. The draft arms 3 can by pivotally raised or lowered in response to actuation of the actuator 9. The hitch adapter 7 carries an upper hook 11 adapted for connecting to a cross pin 12 on the implement mast not shown. Lower hooks 13 have upwardly facing openings for receiving crossbars 14 on the lower end of the implement mast. Lower hooks 13 each carry a latch means to secure the crossbars 14 in the lower hooks 13. This latch includes a latch element 15 connected to pendulum rod 16 and pivoted at 62 to the hitch adapter 7. The pendulum rod 16 pivotally connects the clevis 17 on the end of the cable 18. The cable 18 extends to connect to the crossbar 19 on the lever 20. Similarly, the latch element 21 is connected by a cable 22 to crossbar 19. The lever 20 operates the latch 15 and 21 simultaneously.

Figure 2:
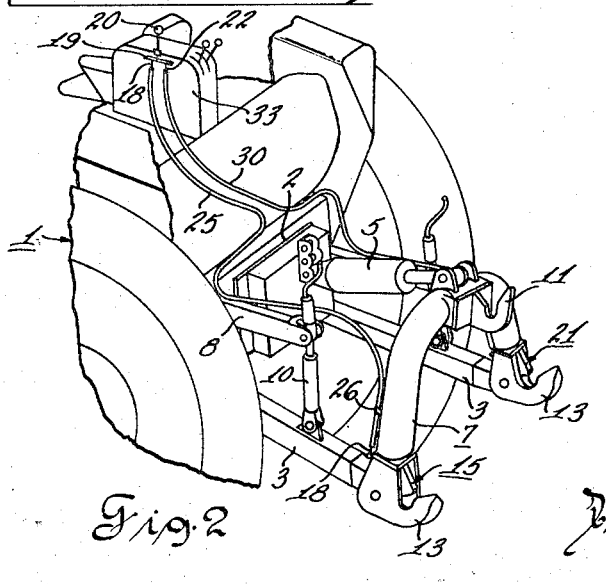
FIG. 2 illustrates a fragmentary three dimensional view of the three-point hitch and the cable operator for the latch.
Figure 6:
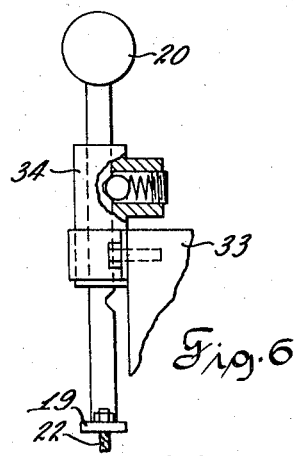
FIG. 6 is a view of the control lever with a portion of the detent broken away.

A cable 18 is encased in a sheath 25 which is fastened by the fastener 26 to the hitch adapter 7. Referring to FIG. 2 it is shown that there is sufficient slack in the cable sheath to permit vertical and lateral movement of the hitching device without unlatching the latch. The hitch adapter may be raised or lowered and is permitted to a degree lateral movement to accommodate hitching to the implement and also during the normal operating of the implement when it is drawn by the tractor.

The upper end of the sheaths 25 and 30 are also fastened by the fitting 31 and 32 to the control panel 33. Control panel 33 carries a sleeve 34 through which the lever 20 can be moved axially to engage or disengage the latch. The latch 15 is normally in the engaged position as shown in FIG. 1.

Figure 3:
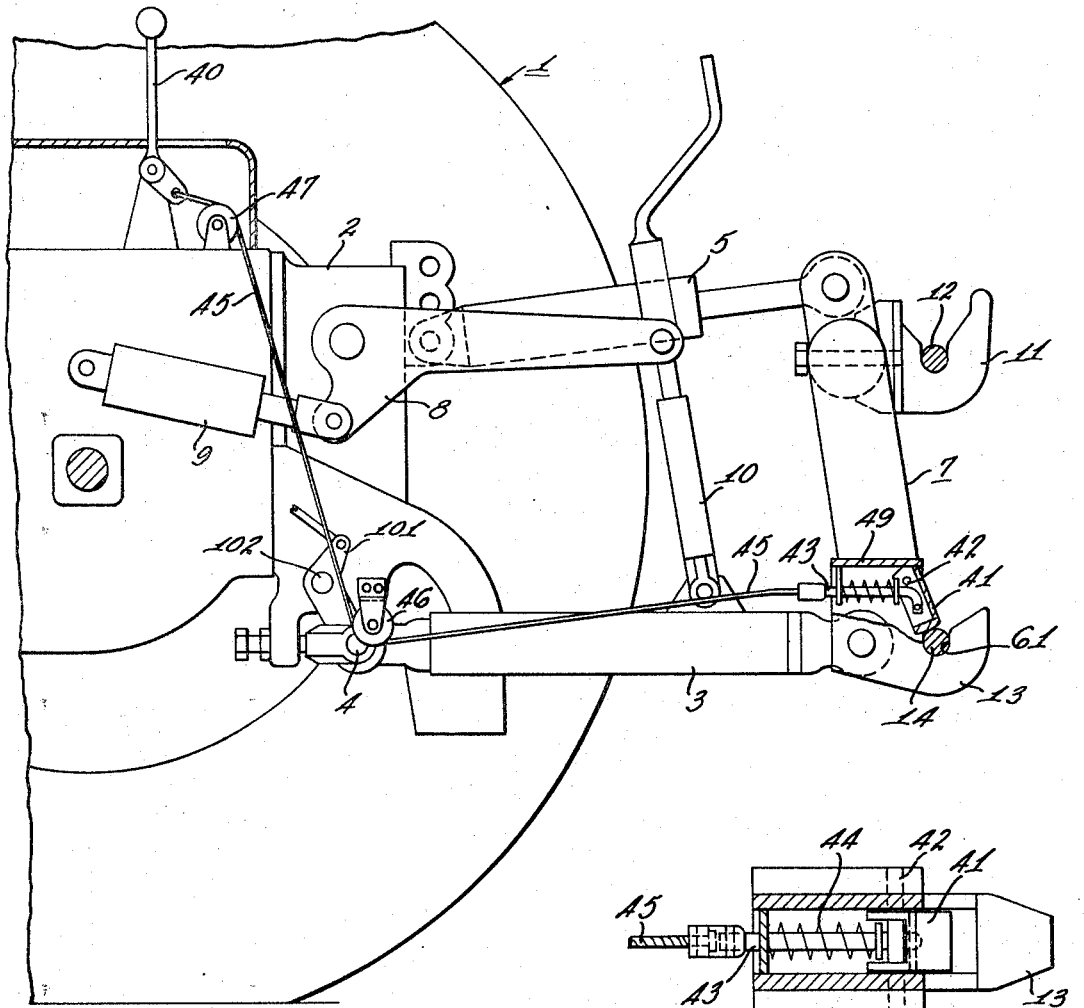
FIG. 3 illustrates a modification of a cable-operated latch operating through the pivot point of the draft arms.
Figure 4:
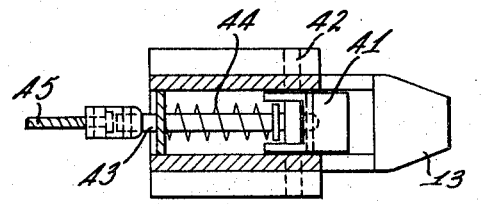
FIG. 4 illustrates a fragmentary section of the latch taken on line IV-IV of FIG. 5.
Figure 5:
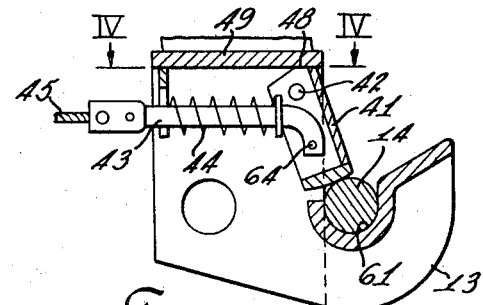
FIG. 5 illustrates a cross section view of the latch.

Referring to FIGS. 3, 4 and 5 a modification is illustrated in which a sheath cable is not used. The principle involved in the modification is passing the cable through the pivot point for the lower draft arms 3. The dimension between the actuating lever 40 and the pivot point of the draft arm 3 is substantially a constant dimension regardless of the position of the draft arm 3 which can pivot upwardly or downwardly from the horizontal position as shown in FIG. 3.

The tractor 1 includes a crankcase 2 for supporting a crossshaft 4 providing a pivotal support for the draft arms 3. The draft arms 3 operate through a lever 101 which is supported on a torsion bar 102 on the tractor. The three-point hitch includes the upper link 5 and the draft arms 3 which are pivotally supported on their front end. The rear end of the upper link 5 and the draft arm 3 are pivotally connected to the hitch adapter 7. The hitch adapter includes an upper hook 11 and lower hook 13 for receiving the cross pin 12 and crossbars 14 respectively. The actuator 9 operates a bellcrank 8 which pivotally connects the lift links 10. The lift links 10 are connected to the intermediate portion of the draft arms to pivot the draft arms about the cross-shaft 4 as illustrated.

Pivotal movement of the draft arms would unlatch a latch wherein the cable does not pass through the pivotal axis of the draft arms 3. The latch shown consists essentially of a latch element 41 pivoted on the pin 42 in the hitch adapter 7. The latch element 41 is connected to a pushrod 43 spring biased by the spring 44 to a rearward position. The cable 45 extends forwardly and rotates on a pulley 46 mounted adjacent the pivoting axis on the draft arms 3. The cable then passes around the pulley 47 mounted on the gearcase and is fastened to the lever 40. As the lever 40 is pivoted, the cable wraps around the pulley 47 and withdraws the latch element 41 to release the crossbar 14 in the hook 13.

FIGS. 4 and 5 illustrate the details of the latching mechanism. It is noted that the crossbar 14 of the implement is received within the opening 61 of the hook 13. The latch element 41 holds the crossbar 14 in the hook. Any force transmitted from the crossbar 14 will tend to close the latching element 41 and cause the greater portion of the force exerted from the bar 14 at the point 48 on the plate 49. This force does not create any appreciable shear stress on the pin 42 and accordingly this increases the life of the latch mechanism. A cross section is shown in FIG. 4 wherein the cable 45 is connected to a rod 43 to withdraw the latch 41. The preferred embodiments of this invention have been described and the operation will be set forth in the following paragraphs.

Referring to FIGS. 1 and 2 the sheathed cable actuating means is shown. As the lever 20 is raised the cables 18 and 22 are drawn upwardly. The relative movement of the cables relative to the sheath attachment 31 and 32 of the sheaths 25 and 30 on the panel 33 provides a movement which is transmitted through the cable to the latch end. As the cables are drawn through their respective sheaths 25 and 30 the pendulum rod 16 is pivoted about the pin 62 thereby withdrawing the latch element 15 from the opening 61 in the hook 13. This permits the crossbar 14 to freely move from its seat in the hook 13. Accordingly, the implement can be disengaged by withdrawing the latch element and moving the hitch adapter 7 to release the implement.

When it is desired to again engage an implement the lever 20 is returned to the position as shown in FIG. 1. The lever 20 is raised to allow the crossbar 14 to be received in the opening 61 of the lower hook 13. Simultaneously the cross pin 12 will be seated in the opening of the hook 11. The lever 20 is then lowered to lock the latch. Any movement of the crossbar causing a tendency to move out of the opening 61 will be prevented by the latch element 15.

Referring to FIG. 3, 4 and 5 a modification is illustrated whereby a cable 45 operates a latch element 41 by withdrawing the latch from its normally closed position. The pushrod 43 is bent downwardly relative to the axis of the pushrod 43 to engage the latch element 41 by means of the pin 64 which produces a mechanical advantage for actuation to ease the force required to unlatch the crossbar 14. The operation of this device is different in that the cable 45 is not sheathed and its relative movement created by actuating lever 40 causes the cable to wrap around the pulley 47 and 46 and withdraw the pushrod 43 and the latch element 41. The relative movement on the actuating end connected to the actuating lever 40 is substantially equal to the movement on the latch end controlling the latch rod 43.

When it is desired to latch the implement, the pushrod 43 will retract against the force of spring 44 and permit the crossbar to seat in the opening 61. The spring 44 will then cause the latch element 41 to reseat itself in a closed position and lock the crossbar 14 in this position.

It is noted that either the lever 20 or the lever 40 of these two versions are mounted at the operator's station on the vehicle. Either one of these levers will provide a visual indication to the operator of the position of the latch on the hitch. The reason for this being that the movement on the actuating end of the cable is essentially equal to the movement of the latch end of the cable and thereby the lever position will indicate the latch position.

The preferred embodiments of this invention have been illustrated and described and will be defined by the attached claims.

We claim:

1. A latching means for use on a vehicle three-point hitch having draft arms pivotally connected to the vehicle comprising a hook means connected to the rear ends of the each said draft arms defining an opening adapted for receiving a crossbar of an implement, a latch pivotally supported on said hook means adapted for locking the crossbar of said implement in said opening, a remotely positioned cable actuator mounted on the vehicle chassis for operating said latch including a cable-operating lever movable relative to said vehicle, a motion-transmitting cable, means confining said cable to a predetermined movement on said vehicle, means connecting said cable to said lever of said actuator and to said latch for producing a predetermined cable movement at the latch end in response to a predetermined lever and cable movement relative to the vehicle at the actuator end regardless of draft arm positions to thereby provide a means of remotely operating said latch.

2. A latching means for a vehicle hitch as set forth in claim 1 including a sheath, supporting means for the cable actuator and said hook means supporting said sheath, to thereby transmit to the latch end of said cable a movement equal to the actuator end movement for operating said latch.

3. A latching means on vehicle hitch as set forth in claim 2 including a pendulum rod integral with said latch, means connecting said cable to said pendulum rod to pivot said latch away from the opening on said hook means to thereby release the crossbar of said implement.

4. A latching means on a vehicle hitch as set forth in claim 1 wherein said cable includes guide means for directing said cable through the pivot point of said draft arms to thereby provide substantially constant cable dimensions between said pivot point and said actuator and said pivot point and said latch regardless of the pivotal position of said draft arms.

5. A latching means on a vehicle hitch as set forth in claim 1 means connecting said cable to said latch at a point remote from the pivot end of said latch to reduce the actuating force required to pivot said latch.

6. A latching means on a vehicle hitch as set forth in claim 1 including a spring biasing means engaging said latch to normally bias said latch to a closed position.

7. A latching means for a vehicle hitch as set forth in claim 1 wherein said hitch includes two draft arms, said latch means includes two cables for actuating latches on each of said draft arms, a lever having a crossbar connected to each of said cables to thereby simultaneously engage and disengage said latches.

8. A latching means on a vehicle hitch as set forth in claim 1 wherein said cable operates to disengage said latching means including, a pulley supported on said vehicle to carry said cable on said actuator, a pulley mounted on said tractor to carry said cable through a point coinciding the pivoting axis of said draft arm thereby providing positive latching and delatching regardless of the pivotal position of the said draft arms.

9. A latching means on a vehicle three-point hitch as set forth in claim 1 wherein said three-point hitch carries a hitch adapter pivotally supported to an upper link and two draft arms and, said latch is pivotally connected to said hook means, a curved actuating rod pivotally connected to said latch extending downwardly to a connecting point adjacent the crossbar of said implement to thereby permit increased clearance between the connection of said draft arm and said hitch adapter.

10. A latching means for a vehicle hitch as set forth in claim 1 including means defining an operator's station on said vehicle, means supporting said cable actuator at a point adjacent the operator's station, said lever providing movement of said latch through cable movement to thereby provide a visual indication to the operator of the vehicle of the position of said latch on said hitching means.